US012644715B2

(12) United States Patent
Berk et al.

(10) Patent No.: US 12,644,715 B2
(45) Date of Patent: Jun. 2, 2026

(54) PENALIZING DIFFICULT IMMEDIATE MANEUVERS IN ROUTING COST FUNCTIONS

(71) Applicant: Uber Technologies, Inc., San Francisco, CA (US)

(72) Inventors: Rifat Berk, San Francisco, CA (US); Joseph Kelly Barker, Portland, OR (US); Pranav Deepak Agrawal, Seattle, WA (US); Vineet Khosla, Pacifica, CA (US); Nishanth Mohan, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 113 days.

(21) Appl. No.: 18/630,479

(22) Filed: Apr. 9, 2024

(65) Prior Publication Data

US 2024/0255295 A1      Aug. 1, 2024

Related U.S. Application Data

(63) Continuation of application No. 17/487,350, filed on Sep. 28, 2021, now Pat. No. 11,988,515.

(51) Int. Cl.
*G01C 21/34* (2006.01)
*G06Q 10/02* (2012.01)

(52) U.S. Cl.
CPC ..... *G01C 21/3453* (2013.01); *G01C 21/3446* (2013.01); *G06Q 10/02* (2013.01)

(58) Field of Classification Search
CPC ............ G01C 21/3453; G01C 21/3446; G01C 21/3461; G06Q 10/02
See application file for complete search history.

(56) References Cited

U.S. PATENT DOCUMENTS

| | | | |
|---|---|---|---|
| 11,604,079 B1 | 3/2023 | Karamete | |
| 2007/0299599 A1 | 12/2007 | Letchner et al. | |
| 2019/0354109 A1 | 11/2019 | Pierson et al. | |
| 2020/0208998 A1* | 7/2020 | Xiang ..................... | G06F 16/29 |
| 2022/0136846 A1 | 5/2022 | Bhorkar et al. | |
| 2022/0340177 A1 | 10/2022 | Khayatian et al. | |
| 2023/0085192 A1* | 3/2023 | Young ................... | G08G 1/017 701/117 |
| 2023/0154327 A1 | 5/2023 | Huang et al. | |
| 2023/0324187 A1 | 10/2023 | Wang et al. | |

* cited by examiner

*Primary Examiner* — Donald J Wallace
(74) *Attorney, Agent, or Firm* — Schwegman Lundberg & Woessner, P.A.

(57) ABSTRACT

A transportation management system generates routing guidance from an origin location to a destination location by modifying edge weights in a graph of a geographic location to penalize difficult immediate maneuvers. Responsive to receiving a routing request, the system identifies a position of a provider device in a base map having edges representing road segments and nodes representing intersections between road segments. A sub-graph is generated for the edges in the base graph located up to a threshold distance from the origin location, and the system modifies the weight of one or more edges in the sub-graph corresponding to a difficult immediate maneuver. When applying a routing algorithm to generate the routing guidance, the system uses the edge weights of the generated sub-graph for a first portion of the routing guidance and the original edge weights of the base graph for a second portion of the routing guidance.

18 Claims, 6 Drawing Sheets

Receive origin location for routing guidance
405

Generate sub-graph of origin location
410

Identify immediate maneuvers for edge weight modification
415

Assign modified edge weight to identified maneuvers
420

Generate route from origin location to destination location
425

PENALIZING DIFFICULT IMMEDIATE MANEUVERS IN ROUTING COST FUNCTIONS

CROSS-REFERENCE TO RELATED APPLICATIONS

This application is a continuation of U.S. application Ser. No. 17/487,350, filed Sep. 28, 2021, which is incorporated by reference.

BACKGROUND

The described embodiments generally relate to providing routing guidance to a vehicle, and more particularly, to modifying edge weights in a graph of a geographic location to penalize difficult immediate maneuvers and reduce the likelihood that such maneuvers are selected for inclusion in the routing guidance.

Transportation services facilitated by a central transportation management system typically involve a vehicle with or without a driver picking up a rider or group of riders from a pickup location and transporting them to a desired destination location. Pickups and drop-offs for these trips often occur close to road intersections, such as a street corners, such that the driver must navigate the vehicle from a stopped position at or near the street corner through the intersection. Such maneuvers may be difficult and dangerous to achieve, particularly in instances where routing guidance directs the driver to cross one or more lanes of traffic. For example, the vehicle might be located in a right turn only lane, but the routing guidance might instruct the vehicle to turn left or continue straight. Existing navigation systems do not account for the difficulty and risk of such maneuvers in calculating routing guidance for a trip.

SUMMARY

To reduce a likelihood that a dangerous immediate maneuver will be selected for inclusion in routing guidance from a first location (e.g., an origin location) to a second location (e.g., a destination location), a transportation management system modifies the weight of a corresponding edge in a base graph of the geographic location.

For each trip taken by a vehicle associated with the transportation management system, a planned route is generated from an origin location to a destination location. The route identifies a set of coordinates, transition points, or other location data points for the vehicle to traverse during the trip. The trip may be a transportation service provided by the vehicle to one or more riders or may correspond to a vehicle (with or without a provider or a rider) traveling to a pickup location or to an area of high demand.

The transportation management system maintains graphs of geographic regions that include edges associated with road segments and nodes associated with intersections between the road segments. Each edge in a graph of a geographic location (referred to herein as a "base graph") is assigned an edge weight that represents a cost of executing the associated road segment. The cost of traversing an edge may be represented as a function of distance and/or time where the route from the origin location to the destination location is the series of maneuvers having the lowest overall cost.

To determine the route, the transportation management system generates a sub-graph of edges and nodes located with a threshold distance or time of the origin location and determines within the sub-graph one or more immediate maneuvers for which to modify the base graph edge weight. To do so, the transportation management system identifies maneuvers that are classified as dangerous immediate maneuvers (e.g., a maneuver that the transportation management system has determined would be particularly difficult for a vehicle to take immediately after leaving a first location or immediately before arriving at a second location, such as a maneuver that requires a vehicle to travel straight from a right-turn only lane or otherwise travel across lanes of traffic over a short period of time or distance). For each identified dangerous immediate maneuver, the transportation management system assigns a weight to the corresponding edge in the sub-graph that is higher than the weight for the same maneuver in the base graph. By assigning a higher weight to the dangerous immediate maneuver, the transportation management system penalizes the maneuver by increasing its cost such that the maneuver is less likely to be included in the planned route from the origin location to the destination location. In one embodiment, the transportation management system also identifies one or more encouraged maneuvers (e.g., a legal U-turn that would reduce overall travel time and distance) and assigns a lower weight to the edge associated with the encouraged maneuver in the sub-graph to increase the likelihood that the maneuver will be included in the route.

After assigning modified edge weights to the identified maneuvers, the transportation management system generates the planned route using the sub-graph and the base graph. In one embodiment, the transportation management system applies a routing algorithm, such as Dijkstra's algorithm, that uses the sub-graph for a first portion of the routing guidance from the origin location to the radius of the sub-graph and uses the base graph for a second portion of the routing guidance from the radius of the sub-graph to the destination location. The generated route may be provided for display to a provider device and, in embodiments where the provider is transporting a rider to a destination location, to the rider device.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
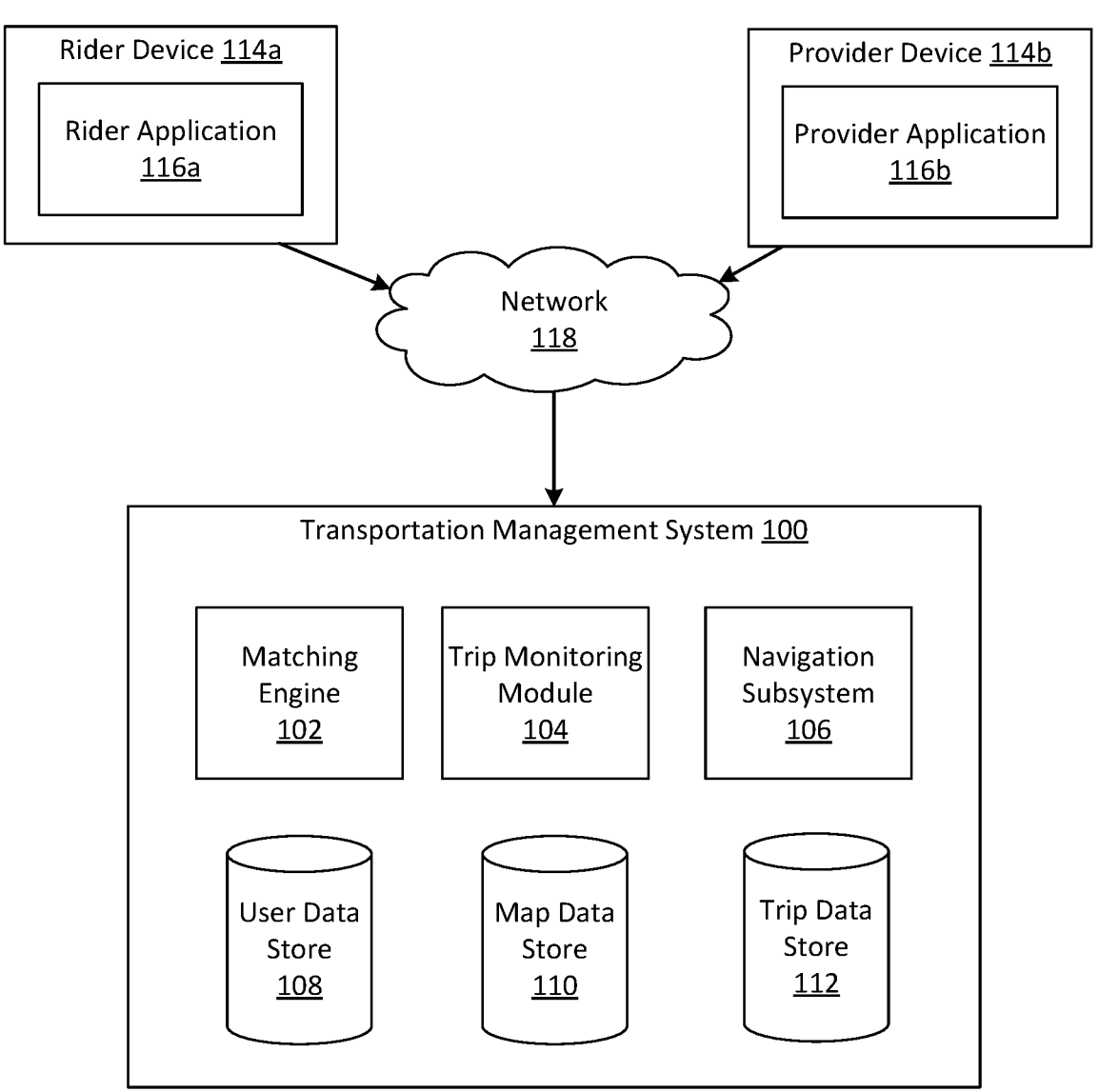
FIG. 1 illustrates a transportation management system for providing transportation services to riders, in accordance with an embodiment.

Turning now to the specifics of the system architecture, FIG. 1 illustrates a system environment for a transportation management system 100 for calculating and providing routing guidance to a provider of a transportation service, in accordance with an embodiment. The transportation management system 100 includes a matching engine 102, a trip monitoring module 104, a navigation subsystem 106, a user data store 108, a map data store 110, and a trip data store 112. FIG. 1 also illustrates a rider device 114a having a rider application 116a, a provider device 114b having a provider application 116b, and a network 118. In other embodiments, the transportation management system 100 may include additional, fewer, or different components for various applications. Conventional components such as network interfaces, security functions, load balancers, failover servers, management and network operations consoles, and the like are not shown so as to not obscure the details of the system architecture.

In some embodiments, users such as riders and providers (also referred to as "drivers") use their client devices 114a and 114b, respectively, or more generally 114, to register with the transportation management system 100, for example, by creating accounts and providing user information (e.g., contact information, a home or office address, or billing information) to the transportation management system 100. The system 100 can store the user information in the user data store 108 and trip records in the trip data store 112, for instance including information for trip records describing trips that a rider received from providers, or trips that a provider provided to riders. The system 100 can associate feedback received from a user or data from trips taken with the user's registered account.

The devices 114a and 114b execute a rider application 116a and a provider application 116b, respectively, or more generally 116, that communicates with the transportation management system 100. For example, the rider operates the rider application 116a to view information about the system 100 and to make a request for service from the system 100 for a delivery or transport service (a "trip") for the rider (and, optionally, additional persons) and/or items, such as cargo needing transport. The rider application 116a enables the rider to specify a pickup and/or a destination location associated with the trip. The pickup and/or destination location for a trip may be a location input by the rider or may correspond to the current location of the rider device 114a as determined automatically by a location determination module (not shown) in the rider device 114a, e.g., a global positioning system (GPS) component, a wireless networking system, or a combination thereof. For purposes of simplicity, as described herein, the pickup location may be (i) determined by the rider application 116a (e.g., based on the current location of the rider device 114a using a GPS component, (ii) specified or selected by the rider, or (iii) determined by the system 100.

According to examples herein, the rider device 114a can transmit a set of data (e.g., referred to herein as "service data") to the transportation management system 100 over the network 118 in response to rider input or operation of the rider application 116a. Such service data can be indicative of the rider's interest in potentially requesting service (e.g., before actually confirming or requesting the service). For example, the rider may launch the rider application 116a and specify a pickup location and/or a destination location to view information about the transportation service before making a decision on whether to make a request for service. The rider may want to view information about the average or estimated time of arrival for pick up by a provider, the estimated time to the destination, the price, the available service types, etc. Depending on implementation, the service data can include the pickup and/or destination location information, rider information (e.g., identifier), application information (e.g., version number), device identifier or type, etc. According to some examples, each time the rider modifies the pickup and/or destination location, the rider application 116a can generate and transmit the service data to the transportation management system 100.

Once the rider confirms or orders a service via the rider application 116a, the rider application 116a generates data corresponding to a request for the service through the transportation management system 100 (e.g., also referred to herein as a "trip request"). Responsive to receiving a trip request, the matching engine 102 selects a provider to service the request (e.g., to provide the requested transportation to the rider). For example, the matching engine 102 receives a trip request from a rider device 114b and determines a set of candidate providers that are online, available to transport a rider, and near the identified pickup location for the rider. The matching engine 102 selects a provider from the set of candidate providers to which it transmits an assignment request. The provider can be selected based on factors such as the provider's location, the pickup and/or destination location, a type of the provider vehicle, and/or an amount of time the provider has been waiting for an assignment request, among other factors. Some factors may be weighted more than others when selecting the provider. For example, provider location may be a greater factor than vehicle type, or vice versa, depending upon the embodiment or the preferences of the implementer. For convenience, this disclosure describes an embodiment in which the vehicle is operated by a driver. However, embodiments described herein may be adapted for vehicles that do not necessarily need to be operated by a person. For example, in one embodiment, the matching engine 102 selects an autonomous vehicle to fulfill the trip request. In embodiments in which an autonomous vehicle is used to provides transportation services to riders, the provider device 114b may be an on-board computing system of the autonomous vehicle.

In some embodiments, the matching engine 102 selects the provider who is closest to the pickup location or who will take the least amount of time to travel to the pickup location (e.g., having the shortest estimated travel time to the pickup location based on routing and map information from a data source). Other factors may be considered as well depending upon the embodiment, for example, whether or not a provider's vehicle has enough available seats for multiple riders in the requesting rider's party. The matching engine 102 sends an assignment request to the selected provider. If the provider accepts the assignment request, then the matching engine 102 assigns the provider to the rider. If the provider rejects the assignment request, then the matching engine 102 selects another provider and sends a subsequent assignment request to the provider device 114b for that provider.

In one embodiment, the set of candidate providers are ranked based on one or more factors and the highest ranked candidate provider is sent the assignment request. In such embodiments, if the highest ranked candidate provider rejects the assignment request, the next highest ranked candidate provider is selected and sent a subsequent assignment request, and so on until a candidate provider accepts the subsequent assignment request.

The provider operates the provider device 114*b* executing the provider application 116*b* that communicates with the transportation management system 100 to provide information indicating whether the provider is available or unavailable to provide transportation services to riders. The provider application 116*b* can also present information about the system 100 to the provider, such as invitations to provide service, navigation instructions, map data, etc. In one embodiment, the provider application 116*b* enables the provider to provide information regarding availability of the provider by logging into the system 100 and activating a setting indicating that they are currently available to provide service. The provider application 116*b* also provides the current location of the provider or the provider device 114*b* to the system 100. Depending on implementation, the current location may be a location input by the provider or may correspond to the current location of the provider device 114*b* as determined automatically by a location determination module (not shown) in the provider device 114*b* (e.g., a GPS component, a wireless networking system, or a combination thereof. The provider application 116*b* further allows a provider to receive, from the matching engine 102, an invitation message to provide a service for a requesting rider, and if the provider accepts via input, the provider application 116*b* can transmit an acceptance message to the matching engine 102. The matching engine 102 can subsequently provide information about the provider to the rider application 116*a*. As another embodiment, the provider application 116*b* can enable the provider to view a list of current trip requests and to select a particular request to fulfill. The provider application 116*b* can also receive routing information from the navigation subsystem 106, as discussed below with respect to FIG. 2. The provider application 116*b* enables a provider to provide a rating for a rider upon completion of a trip. In one embodiment, the rating is provided on a scale of one to five, five being the maximal (best) rating.

The devices 114 are portable electronic devices such as smartphones, tablet devices, wearable computing devices (e.g., smartwatches) or similar devices. Alternatively, the provider device 114*b* corresponds to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities.

The trip data store 112 stores data related to one or more past trips facilitated by the system 100. Trip data may include information about one or more of a pickup location and a destination location of a trip, a route taken between the pickup and the destination, a time of the trip, and an identification of the trip provider. The trip data may also include location information gathered by the location sensor on one or more devices 114 during the trip. Stored trip information can also include route features such as traffic signals and road signs, an estimated trip duration generated at the time a trip was requested, and an actual trip duration. In some embodiments, the trip data store 112 stores data related to trips taken by a provider that were not requested by a rider and that did not involve rider transport. For example, the system may suggest routes to a provider to encourage the provider to move toward an area of high demand (e.g., an area where many riders are requesting trips).

The trip monitoring module 104 receives data about trips as trips occur, which may include a provider's movement independent of transporting a rider. Trip data may include information about an origin and destination, traffic conditions, whether the provider follows the suggested route, and feedback and incident reports submitted by riders or providers. Additionally, the trip monitoring module 104 may receive location sensor data from devices 114 as trips occur. Location sensor data may include location coordinates, time stamps associated with the location coordinate data, and other information updated during the trip. Trip data collected by the trip monitoring module 104 is stored in the trip data store 112.

The map data store 110 stores map information for geographic regions in which the transportation management system 100 offers services such as transportation for riders. The map information includes map data about roads or road segments within the geographic regions. For purposes of this disclosure, roads can include any route between two places that allows travel by foot, motor vehicle, bicycle, or other suitable form of travel. Examples of roads include streets, highways, freeways, trails, bridges, tunnels, toll roads, or crossings. Roads may be restricted to certain riders or may be available for public use. An intersection is a section of one or more roads that allows a user to travel from one road to another. Roads may be divided into road segments, where road segments are portions of roads that are uninterrupted by intersections with other roads. For example, a road segment would extend between two adjacent intersections on a surface street or between two adjacent entrances/exits on a highway. In one embodiment, the geographic region is represented as a graph, with nodes on the graph representing intersections, and edges representing road segments between intersections.

The map data store 110 also stores map properties such as navigation rules for map data, which can include road properties that describe characteristics of road segments, such as speed limits, road directionality (e.g., one-way or two-way), traffic history, traffic conditions, addresses on the road segment, length of the road segment, and type of road segment (e.g., surface street, residential, highway, toll). The map properties can also include properties about road intersections, such as turn restrictions, light timing information, traffic throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topographical properties such as hills and mountains, elevations and slopes thereof, bodies of water, buildings, etc.

The navigation subsystem 106 calculates and provides routing guidance from an origin location to a destination location. In one embodiment, the origin location is a pickup location for a trip. Alternatively, the origin location is a current location of the vehicle other than at a pickup location (e.g., traveling to a pickup location or an area of high demand). The destination location may be a destination for a transportation service provided to one or more riders or may be a destination input by the provider or determined by the transportation management system 100, such as a pickup location for a trip.

The route designates a path for the vehicle to follow to reach the destination and may designate various road segments (e.g., edges in the graph of the geographic region) and transitions between roads (e.g., nodes), such as turns, for the vehicle to execute. In one embodiment, a navigation route may include more than one pickup and/or destination location, depending upon whether other riders are picked up after an initial rider is picked up. If other riders are picked up, their destinations are added as stops to the navigation route, which may be re-determined to account for the new navigation locations. In an embodiment, destinations are prioritized in the navigation route based on when the riders were picked up, on a first-in, first-out basis.

Figure 2:
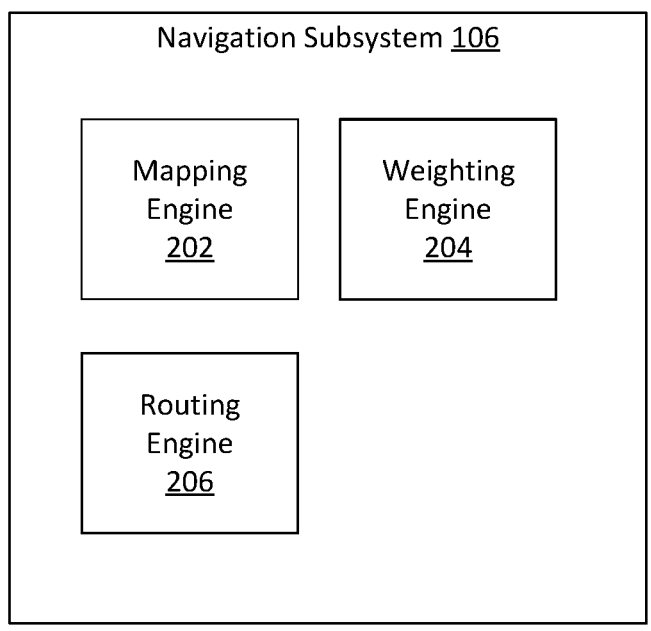
FIG. 2 illustrates a navigation subsystem of the transportation management system of FIG. 1, in accordance with an embodiment.

FIG. 2 illustrates the navigation subsystem 106 in further detail, in accordance with an embodiment. As shown in FIG. 2, the navigation subsystem 106 includes a mapping engine 202, a weighting engine 204, and a routing engine 206. The modules of the navigation subsystem 106 generate and provide to one or more devices 114 a route from an origin location to a destination location. In one embodiment, the origin and destination locations are a pickup location and a destination location for a transportation service provided to one or more riders. Alternatively, the origin location corresponds to a current location of a vehicle other than at a pickup location such that the routing guidance begins at the vehicle location and ends at a destination location input by a provider or determined by the transportation management system 100 (e.g., a pickup location for a trip, an area of high demand, etc.).

The mapping engine 202 receives from a provider device 114b a current location of the provider device 114b. In one embodiment, the provider device 114b sends to the mapping engine 202 raw location signals, such as GPS coordinates, of the provider device 114b, and the mapping engine 202 "snaps" the location signals to an associated road segment in a graph of the geographic region (referring to herein as the "base graph") to identify a position of the driver device 114b within the graph. That is, for a given provider device 114b, the mapping engine 202 identifies a position of the provider device 114b (and thus, the vehicle) on a road or road segment (e.g., an edge in the base graph) given the map data corresponding to the location signal.

Responsive to identifying the position of the provider device 114b in the base graph of the geographic location, the mapping engine 202 generates a sub-graph of snapped edges from the origin location to a specified threshold (e.g., distance) away. Each snapped edge in the sub-graph is a temporary copy of a portion of an edge in the base graph of the geographic location. That is, the mapping engine 202 generates a new sub-graph for each navigation request (e.g., each trip request) based on the origin location. To generate the sub-graph, the mapping engine 202 identifies the base graph edge that contains the origin location for the trip, creates a copy of the identified edge, and bisects the snapped edge by placing an additional node at the midpoint of the edge to create two sub-edges. For each subsequent edge in the base graph up to a specified threshold away from the origin location, the mapping engine 202 creates a temporary copy of the corresponding base graph edge for inclusion in the sub-graph. The threshold may be distance-based (e.g., a number of meters, kilometers, or miles from the origin location), time-based (e.g., an estimated travel time from the origin location), or based on a number of road segments/edges or intersections/nodes in the base graph. In another embodiment, the size of the generated sub-graph varies based on road properties (e.g., whether the origin location is on a one-way street or a two-way street, the speed limit, the type of road, etc.). In each embodiment, snapped edges in the sub-graph are connected only to the other snapped edges until the sub-graph periphery such that the routing algorithm uses the sub-graph edges to generate routing guidance from the origin location to the periphery of the sub-graph and cannot access the base graph containing the original, unpenalized versions of the penalized maneuvers.

Each edge in the base graph and generated sub-graph is assigned a weight based on a corresponding objective function. The objective function for the base graph of the geographic location is globally defined and the edge weights constant such that a maneuver from a first edge to a second edge will be weighted the same for a first trip and a second trip. To determine a cost associated with a transition (e.g., a maneuver) from a first edge to a second edge, the mapping engine 202 inserts a virtual edge between the first edge and the second edge and assigns a weight to the generated virtual edge. The constant edge weights for maneuvers in the base graph may be stored as map data in the map data store 110. In one embodiment, the objective function for the base graph is to minimize the travel time and/or distance of the trip, and the edge weights are calculated based on a travel time between nodes and a class or type of road segment (e.g., highway, residential, surface street, etc.).

The weighting engine 204 identifies within the generated sub-graph one or more edges for which to modify the weight assigned to the corresponding edge in the base graph. In one embodiment, the identified edges correspond to specified types of maneuvers occurring within the sub-graph. For example, the weighting engine 204 detects one or more difficult immediate maneuvers occurring in the sub-graph. An "immediate" maneuver may be a transition from a first edge to a second edge occurring within a threshold time or distance of the beginning of a route (e.g., a maneuver occurring within the first N seconds, N meters, or N edges from the origin location). An immediate maneuver may be classified as "difficult" if it is hard or risky to perform, as determined by the transportation management system 100. Examples of difficult immediate maneuvers include, but are not limited to, left turns on road segments with >N lanes and straight/left turns if the origin is in a right-turn only lane.

For each identified difficult immediate maneuver in the generated sub-graph, the weighting engine 204 calculates a modified edge weight for the virtual edge between the first edge of the maneuver and the second edge of the maneuver by adjusting the weight assigned to the corresponding virtual edge in the base graph. Accordingly, while the objective functions and edge weights in the base graph are constant, the weighting engine 204 modifies the objective function for edges in the sub-graph such that trip-specific edge weights are assigned to edges in the sub-graph in place of the constant edge weights for the edges in the base graph. The weighting engine 204 may determine the modified edge weight by applying a multiplier to the base graph edge weight or may assign an edge weight to the sub-graph edge that is higher than the weight of the corresponding edge in the base graph. The weights for sub-graph edges not associated with difficult immediate maneuvers are copied from the corresponding edges of the base graph.

In embodiments in which the weighting engine 204 modifies the edge weights by applying a multiplier to the base graph edge weights, the multiplier may be constant or variable (e.g., a function of the distance from the origin, the type of maneuver, or both). For example, the weighting engine 204 might assign a higher multiplier (and thus a greater penalty) to a left turn at the beginning of a route than to a maneuver requiring the vehicle to continue straight in a right-turn only lane. In another example, the values of the assigned multipliers decrease as the distance from the origin location increases (e.g., a difficult immediate maneuver occurring within 100 meters of the origin location is penalized more than a maneuver occurring within 1000 meters of the origin location). In still another example, a first type of difficult immediate maneuver occurring closer to the origin location may have the same or similar multiplier to a second type of difficult immediate maneuver occurring farther from the origin location if the second type of maneuver is more difficult than the first. In other embodiments, the assigned multiplier is constant such that all difficult immediate maneuvers occurring within the sub-graph receive the same penalty, regardless of maneuver type or distance from the origin location. Other factors that the weighting engine 204 may use to determine an assigned multiplier for a snapped edge corresponding to a difficult immediate maneuver include the relevant objective function, the level of difficulty of the maneuver being penalized, provider sensitivity to difficult maneuvers, and the like.

In one embodiment, the weighting engine 204 also modifies an edge weight for an encouraged maneuver. For example, while a multiplier for a difficult immediate maneuver may be greater than 1 such that the edge weight in the sub-graph is higher than the edge weight for the corresponding edge in the base graph, a multiplier of less than 1 may be assigned for an encouraged maneuver such that the edge weight for the encouraged maneuver in the sub-graph is less than the weight of the maneuver in the base graph. Reducing the edge weight for the corresponding maneuver in the sub-graph increases the likelihood that the maneuver will be selected for inclusion in the route from the origin to the destination. An example of an encouraged maneuver includes, but is not limited to, a legal U-turn close to the origin or destination (e.g., if the U-turn is more effective than requiring the vehicle to detour around the block).

The routing engine 206 generates a route from the origin location to the destination location using sub-graph and base graph by evaluating the edge weights of the virtual edges representing transitions/maneuvers between edges in the sub-graph and base graph from the origin location to the destination location. To do so, the routing engine 206 may employ various routing algorithms, such as Dijkstra's algorithm. In one embodiment, the first portion of the Dijkstra search occurs on the snapped sub-graph. That is, the routing engine 206 uses the modified edge weights for road segments with the sub-graph to evaluate maneuvers for inclusion in the route. As discussed above, the sub-graph may comprise a portion of a trip from an origin to a destination location (e.g., edges and nodes representing road segments and intersections for the first N meters or the first N edges or nodes from the origin). For portions of the route occurring outside of the sub-graph (e.g., the remaining distance or edges/nodes to the destination), the routing engine 206 uses the original edge weights in the base graph to evaluate maneuvers for inclusion in the route. A route selected for the trip may be the route having the lowest total score from the origin to the destination. Once selected, the navigation route may be provided by the routing engine 206 to the provider device 114b and/or the rider device 114a for display in whole or in part on a user interface of the devices 114. Origin, destination, and other map data can be specified in various embodiments using street addresses, point-of-interest (POI) location names, coordinates, or other indicia known by those of skill in the art.

Figure 3A:
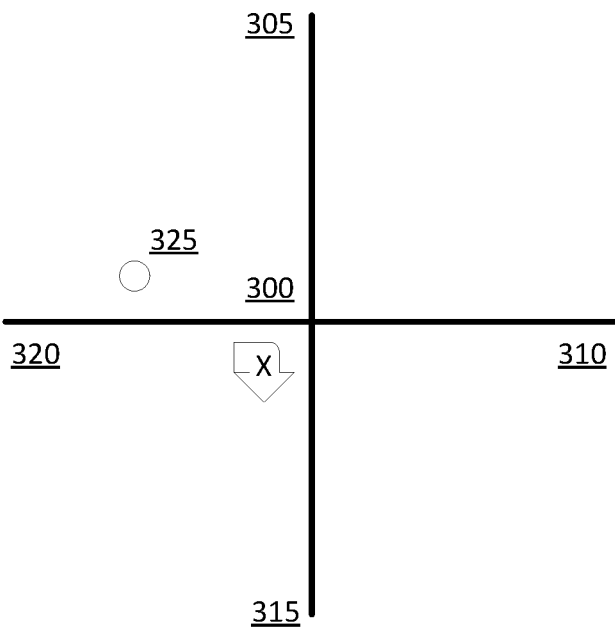
FIG. 3A illustrates a portion of a base graph of a geographic area depicting a four-way intersection, in accordance with an embodiment.

FIG. 3A illustrates a portion of a base graph of a geographic area depicting a four-way intersection 300, in accordance with an embodiment. In the embodiment shown in FIG. 3A, the intersection 300 connects road segments 305, 310, 315, and 320, each represented as an edge in the base graph. An origin location 325 is located along edge 320. The origin location 325 corresponds to a current location of the provider device 114b, such as a pickup location for a trip.

To determine a cost of a turn from a first edge to a second edge (e.g., a right turn at the intersection 300 from road segment/edge 320 to road segment/edge 315), the mapping engine 202 creates an additional edge having a length of zero between the first edge (e.g., the edge 320) and the second edge (e.g., the edge 315) and assigns a weight X to the additional edge. The weight X therefore represents the cost of taking a right turn at the intersection 300. As discussed above with respect to FIG. 2, the edge weights in the base graph are constant and are pre-computed and stored in the map data store 110. Accordingly, the cost X of the turn from edge 320 to edge 315 is the same for a first trip and a second trip.

Figure 3B:
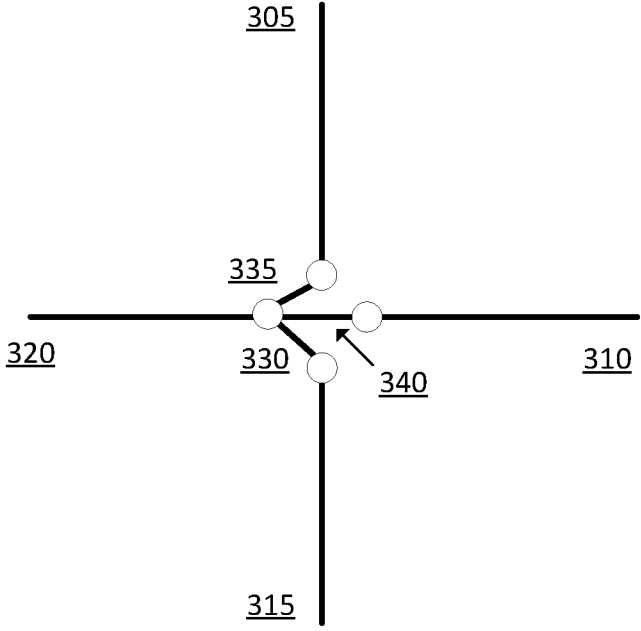
FIG. 3B illustrates the topology of a graph containing virtual edges representing transitions/maneuvers between edges.

FIG. 3B illustrates the topology of a graph containing virtual edges representing transitions/maneuvers between edges. As described above with respect to FIG. 2, the engines of the navigation subsystem 106 insert virtual edges between edges in the base graph and snapped sub-graph and assign weights to the virtual edges to represent the cost of the transitions between the edges. The edge weights assigned to the virtual edges in the base graph may be modified for the corresponding sub-graph edges to penalize identified difficult immediate maneuvers.

The graph illustrated in FIG. 3B shows virtual edges 330, 335, and 340 associated with a transition from the left-most edge 320 to another of the edges 305, 310, and 315 in the graph. The virtual edge 330 represents the transition from the edge 320 to the edge 315 (e.g., a right-hand turn at the intersection 300 shown in FIG. 3A), the virtual edge 335 represents the transition from the edge 320 to the edge 305 (e.g., a left-hand turn at the intersection 300 shown in FIG. 3A), and the virtual edge 340 represents the transition from the edge 320 to the edge 310 (e.g., a maneuver straight through the intersection 300 shown in FIG. 3A). To determine the cost of each of these maneuvers, the weighting engine 204 assigns a constant weight to each virtual edge in the base graph and may apply a constant or variable multiplier to the corresponding virtual edges in the snapped sub-graph to penalize one or more difficult immediate maneuvers. For example, if a left-hand turn at the intersection 300 is identified as a difficult immediate maneuver (e.g., if the vehicle would have to cross multiple lanes of traffic from the origin location to the left-turn lane), the weighting engine 204 assigns a multiplier to the edge weight of the virtual edge 335 to penalize the maneuver and decrease the likelihood that the routing algorithm will select the left-turn for inclusion in the routing guidance from the origin location.

Figure 3C:
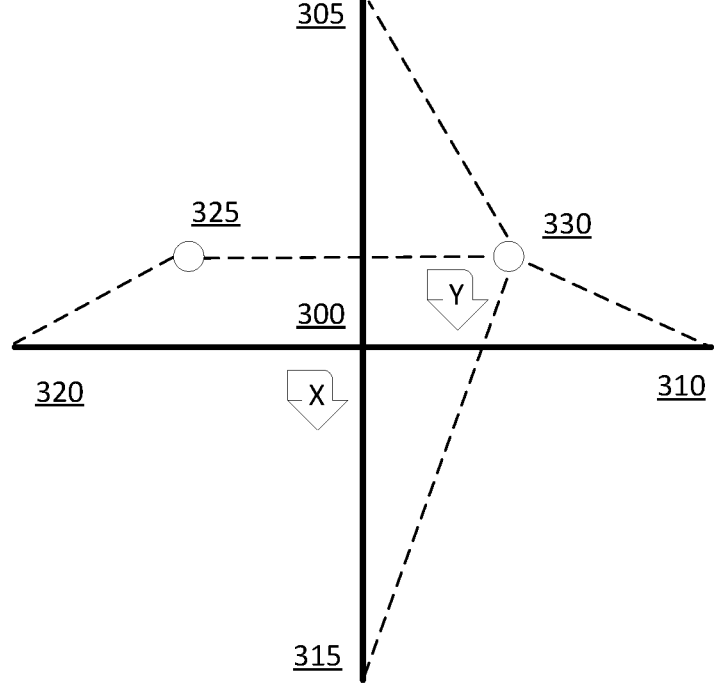
FIG. 3C illustrates a trip-specific sub-graph overlaid on the base graph of FIG. 3A, in accordance with an embodiment.

FIG. 3C illustrates a sub-graph overlaid on the base graph of FIG. 3A, in accordance with an embodiment. As discussed above with respect to FIG. 2, to generate the sub-graph, the mapping engine 202 creates snapped edges for each edge in the base graph within a threshold distance, travel time, or number of edges of the snapped location (here, the origin location 325). For example, in the sub-graph shown in FIG. 3C, the radius extends to the end of each of the edges/road segments 305, 310, 315, and 320.

The dotted lines in FIG. 3C represent the snapped edges of the sub-graph. Each snapped edge has the same physical properties (e.g., geometry) of the corresponding edge in the base graph and represents the same road segments. However, the snapped edges are connected to the original edges at the four corners of the base graph (e.g., at the end of each of the edges 305, 310, 315, and 320). Accordingly, to transition from the snapped edges in the sub-graph to the base graph (e.g., outside the radius of the sub-graph), the vehicle travels through the intersection using the snapped edges. For example, if the vehicle were to make a right turn at the intersection 300, the vehicle would transition from a first snapped edge to a second snapped edge. As discussed above with respect to FIG. 2, if a right turn at the intersection 300 is classified as a difficult immediate maneuver from the origin location 325, the weighting engine 204 alters the weight of the snapped edge for the turn by assigning a weight Y that is greater than the weight X for the turn in the base graph (e.g., by applying a multiplier to the weight X of the virtual edge between the edges 320 and 315). By increasing the weight of the snapped edge Y, the weighting engine 204 penalizes the associated right turn such that the likelihood that the routing engine 206 will select the turn for inclusion in the route is decreased. As discussed above, the weighting engine 204 modifies edge weights for snapped edges up to the specified radius from the starting point, such that the first portion of the routing algorithm uses the snapped sub-graph having modified weights that penalize dangerous immediate maneuvers while the second portion of the algorithm uses the base graph with the original edge weights.

Figure 4:
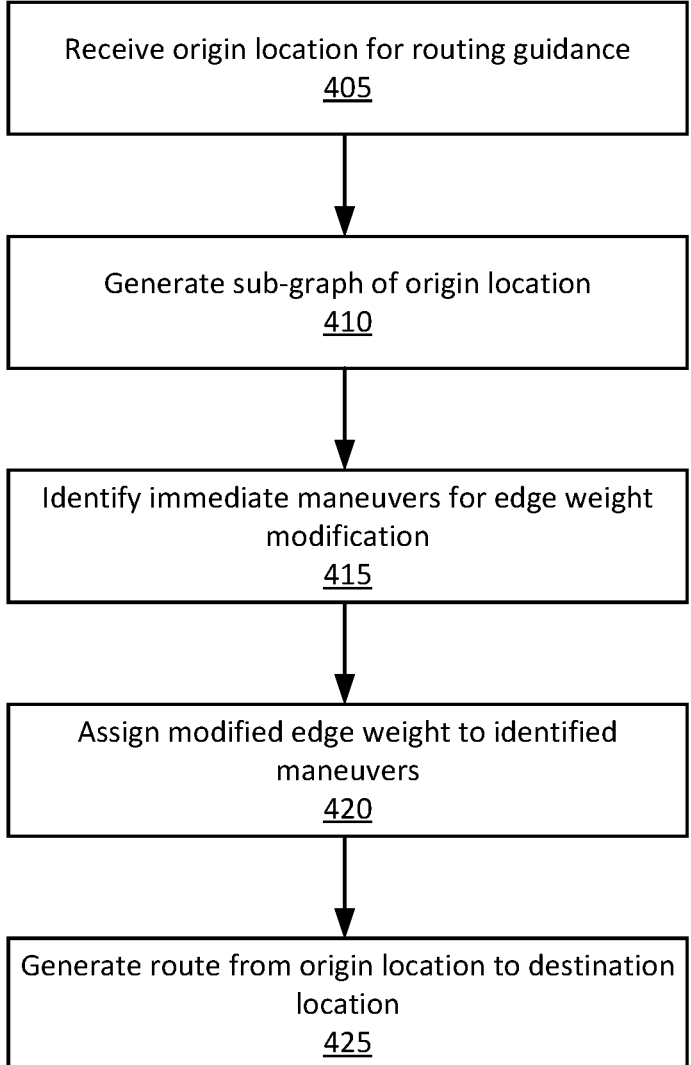
FIG. 4 is a flow chart illustrating a method for adjusting edge weights for identified immediate maneuvers, in accordance with an embodiment.

FIG. 4 is a flow chart illustrating a method for adjusting edge weights for identified immediate maneuvers, in accordance with an embodiment. The steps of FIG. 4 are illustrated from the perspective of the transportation management system 100 performing the method 400. However, some or all of the steps may be performed by other entities and/or components. In addition, some embodiments may perform the steps in parallel, perform the steps in different orders, or perform different steps.

In the embodiment shown in FIG. 4, the method 400 begins at operation 405 with the transportation management system 100 receiving an origin location and a request for routing guidance from the origin location to a destination location. In one embodiment, the origin location is a pickup location for a transportation service for one or more riders. A rider or a provider may send the request for routing guidance to the transportation management system 100 via the rider application 116a operating on the rider device 114a or the provider application 116b operating on the provider device 114b. Alternatively, the origin location is a current location of a vehicle navigating with or without a rider.

The mapping engine 202 identifies the origin location within a base map of the geographic region. As discussed above with respect to FIG. 2, the base map includes edges representing road segments and nodes representing transitions between the road segments (e.g., intersections). At operation 410, the mapping engine 202 generates a sub-graph of the origin location by creating snapped edges for each edge in the base graph within a threshold distance, time, or number of edges/nodes of the origin location. Each snapped edge is a temporary copy of a portion of the corresponding edge in the base graph existing for the duration of the routing request. That is, the mapping engine 202 generates a new sub-graph for a subsequent routing request.

At operation 415, the weighting engine 204 evaluates the snapped edges within the sub-graph to identify one or more immediate maneuvers for which to assign a modified edge weight. A maneuver may be considered an immediate maneuver if it occurs within a threshold distance, time, or number of edges/intersections of the origin location. In one embodiment the identified immediate maneuver is an immediate maneuver occurring within the radius of the snapped sub-graph such as a maneuver requiring the vehicle to take a left turn from a right-turn only lane. Alternatively, the identified immediate maneuver is an encouraged maneuver, such as a legal U-turn that would reduce travel time and/or distance as compared to detouring around the block. The identified maneuvers may be elaborate, such as a 5-way intersection with dedicated lanes) or simple, such as aa left or a right turn. In one embodiment, the identified maneuver type varies based on the geographic location of the vehicle. For example, while a left turn might be classified as a difficult maneuver in a first jurisdiction (e.g., the United States), a right turn might be classified as a difficult maneuver in a second jurisdiction (e.g., the United Kingdom).

For each identified immediate maneuver in the sub-graph, in operation 420 the weighting engine 204 assigns a weight representing the cost of traversing the edge (e.g., the corresponding road segment), where the cost represents the input to the routing algorithm for the maneuver. In one embodiment, the weight of a snapped edge is a value assigned by the weighting engine 204. Alternatively, the weighting engine 204 generates the snapped edge weight by applying a multiplier to the edge weight of the corresponding edge in the base graph. For an immediate maneuver, the edge weight of a snapped edge in the sub-graph is higher than the weight of the corresponding edge in the base graph such that the weighting engine 204 penalizes the immediate maneuver by increasing the cost associated with executing the maneuver. For an encouraged immediate maneuver, the edge weight of the snapped edge is lower than the weight of the base edge weight such that the encouraged maneuver is rewarded or incentivized. Additionally, in one embodiment, the penalty or incentive for a maneuver is a function of the distance from the origin location and/or the type of maneuver. For example, the weighting engine 204 applies a higher penalty for maneuvers occurring closer to the origin location than for maneuvers occurring closer to the sub-graph radius. Alternatively, the penalty or incentive is constant for the snapped sub-graph edges. For example, the weighting engine 204 applies the same multiplier to the edge weight in the base graph for each identified immediate maneuver.

At operation 425, the routing engine 206 generates a route from the origin location to the destination location using the sub-graph and the base graph. For example, as described above with respect to FIG. 2, the first portion of the routing algorithm uses the snapped sub-graph to determine routing guidance from the origin location to the radius of the sub-graph. For maneuvers occurring outside the perimeter of the sub-graph (e.g., from the sub-graph radius to the destination location), the routing engine 206 applies the routing algorithm to the base graph. The identified route from the origin location to the destination may be the route having the lowest overall cost, such that immediate maneuvers are disincentivized by increasing their cost and encouraged maneuvers are incentivized by decreasing their cost.

Figure 5:
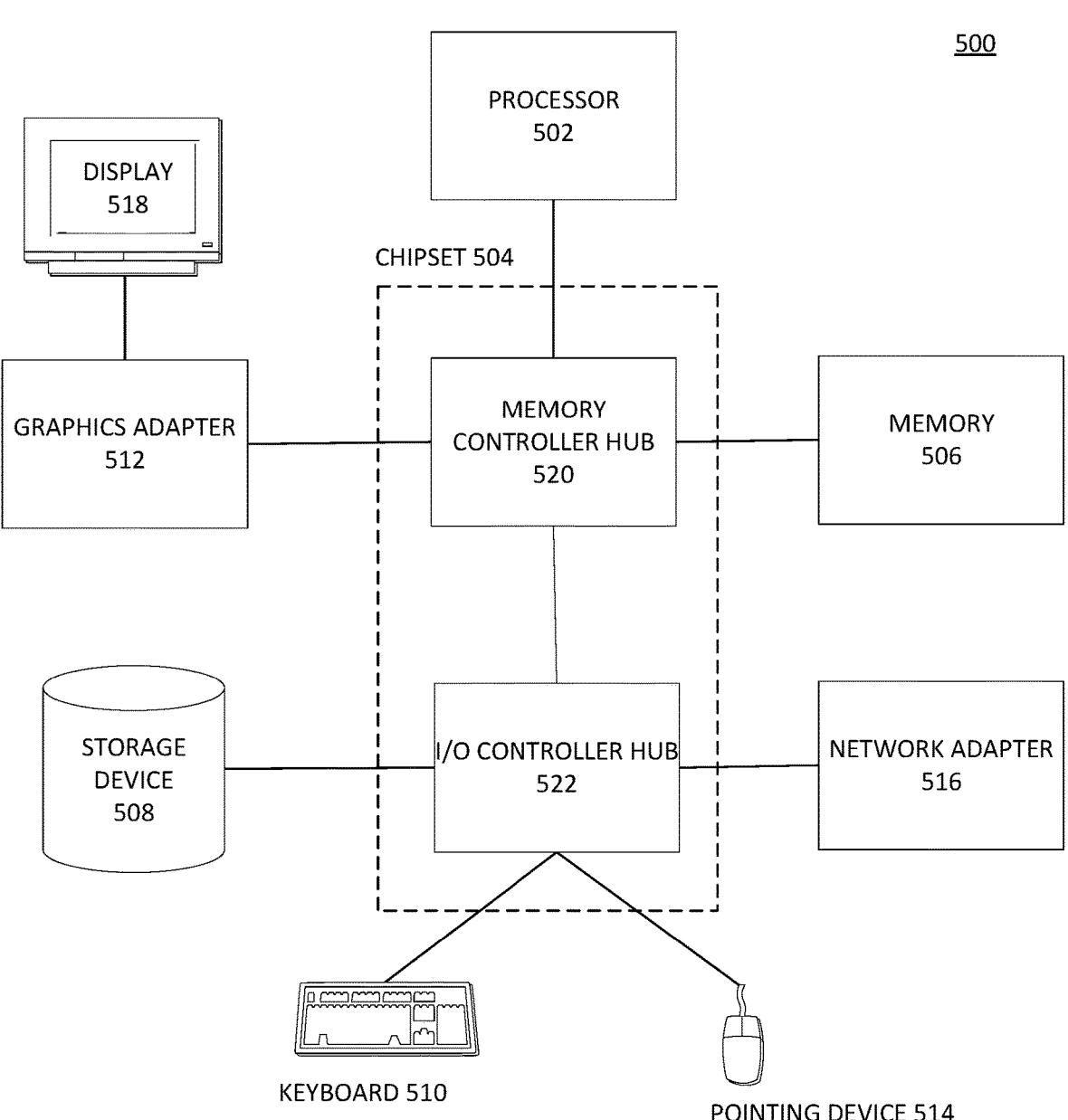
FIG. 5 illustrates example components of a computer used as part or all of the transportation management system, the rider device, and/or the provider device, in accordance with an embodiment.

FIG. 5 is a block diagram illustrating physical components of a computer 500 used as part or all of the transportation management system 100 or the devices 114 from FIG. 1, in accordance with an embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

For convenience, this disclosure describes an embodiment in which the transportation management system generates a sub-graph of edges and nodes located within a threshold distance or time of the origin location (e.g., a pickup location for a transportation services). In other embodiments, the described method is applied symmetrically to the destination of a route to decrease the likelihood that dangerous maneuvers (e.g., crossing multiple lanes of traffic to reach a destination location) are selected for inclusion in routing guidance near the end of a trip.

Moreover, the disclosure describes an embodiment in which the transportation management system penalizes maneuvers consisting of two edges ("simple maneuvers") by inserting a virtual edge between two edges to model a transition. In other embodiments, the system penalizes multi-point maneuvers consisting of three or more edges by inserting a virtual edge between each pair of base graph edges associated with the penalized maneuver. In this way, the system may penalize maneuvers of varying lengths.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for generating routing guidance for a vehicle, the method comprising:

receiving, at a transportation management system from a provider device associated with the vehicle, a request for routing guidance from an origin location to a destination location;

identifying a position of the origin location within a stored road network representation comprising road segments and intersections;

generating a portion of the stored road network representation corresponding to road segments and intersections from the origin location to a threshold distance from the origin location;

generating scores for a series of maneuvers within the portion, wherein scores for one or more maneuvers classified as difficult maneuvers are assigned such that the difficult maneuvers are less likely to be included in the routing guidance than other maneuvers; and generating the routing guidance from the origin location to the destination location using the generated scores for the series of maneuvers occurring from the origin location to the threshold distance from the origin location and routing values from the stored road network representation for maneuvers occurring between the threshold distance from the origin location and the destination location.

2. The computer-implemented method of claim 1, wherein a difficult maneuver includes a left turn on a road segment with greater than a specified number of lanes or a straight or left turn when the origin location is located in a right-turn only lane.

3. The computer-implemented method of claim 1, wherein generating a score for the one or more difficult maneuvers comprises applying a multiplier to an edge weight associated with each of the one or more difficult maneuvers.

4. The computer-implemented method of claim 3, wherein the multiplier is a constant multiplier.

5. The computer-implemented method of claim 3, wherein the multiplier is a variable multiplier and wherein a maneuver occurring at a first distance from the origin location is assigned a higher multiplier than a maneuver occurring at a second distance from the origin location.

6. The computer-implemented method of claim 3, wherein the multiplier is a variable multiplier and wherein a first type of maneuver is assigned a higher multiplier than a second type of maneuver.

7. The computer-implemented method of claim 1, wherein the origin location is a pickup location for a transportation service provided by the vehicle to a destination location.

8. The computer-implemented method of claim 1, wherein the origin location is a current location of the vehicle.

9. The computer-implemented method of claim 1, further comprising classifying one or more candidate maneuvers occurring within a threshold distance of the origin location as encouraged maneuvers, wherein scores for the one or more encouraged maneuvers are assigned such that encouraged maneuvers are more likely to be included in the routing guidance than other maneuvers.

10. A non-transitory computer-readable storage medium storing computer-executable instructions that, in response to executing, cause a device comprising a processor to perform operations comprising:

receiving, at a transportation management system from a provider device associated with a vehicle, a request for routing guidance from an origin location to a destination location;

identifying a position of the origin location within a stored road network representation comprising road segments and intersections;

generating a portion of the stored road network representation corresponding to road segments and intersections from the origin location to a threshold distance from the origin location;

generating scores for a series of maneuvers within the portion, wherein scores for one or more maneuvers classified as difficult maneuvers are assigned such that the difficult maneuvers are less likely to be included in the routing guidance than other maneuvers; and generating the routing guidance from the origin location to the destination location using the generated scores for the series of maneuvers occurring from the origin location to the threshold distance from the origin location and routing values from the stored road network representation for maneuvers occurring between the threshold distance from the origin location and the destination location.

11. The non-transitory computer-readable storage medium of claim 10, wherein a difficult maneuver includes a left turn on a road segment with greater than a specified number of lanes or a straight or left turn when the origin location is located in a right-turn only lane.

12. The non-transitory computer-readable storage medium of claim 10, wherein generating a score for the one or more difficult maneuvers comprises applying a multiplier to an edge weight associated with each of the one or more difficult maneuvers.

13. The non-transitory computer-readable storage medium of claim 12, wherein the multiplier is a constant multiplier.

14. The non-transitory computer-readable storage medium of claim 12, wherein the multiplier is a variable multiplier and wherein a maneuver occurring at a first distance from the origin location is assigned a higher multiplier than a maneuver occurring at a second distance from the origin location.

15. The non-transitory computer-readable storage medium of claim 12, wherein the multiplier is a variable multiplier and wherein a first type of maneuver is assigned a higher multiplier than a second type of maneuver.

16. The non-transitory computer-readable storage medium of claim 10, wherein the origin location is a pickup location for a transportation service provided by the vehicle to a destination location.

17. The non-transitory computer-readable storage medium of claim 10, wherein the origin location is a current location of the vehicle.

18. The non-transitory computer-readable storage medium of claim 10, wherein the operations further comprise classifying one or more candidate maneuvers occurring within a threshold distance of the origin location as encouraged maneuvers, wherein scores for the one or more encouraged maneuvers are assigned such that encouraged maneuvers are more likely to be included in the routing guidance than other maneuvers.

* * * * *